(12) United States Patent
Markstein et al.

(10) Patent No.: US 7,065,757 B2
(45) Date of Patent: Jun. 20, 2006

(54) EFFICIENT COMPILATION OF FAMILY OF RELATED FUNCTIONS

(75) Inventors: Peter Markstein, Woodside, CA (US); James Thomas, Sunnyvale, CA (US); Kevin Crozier, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 667 days.

(21) Appl. No.: 09/964,769

(22) Filed: Sep. 28, 2001

(65) Prior Publication Data

US 2003/0097651 A1    May 22, 2003

(51) Int. Cl.
*G06F 9/45* (2006.01)

(52) U.S. Cl. ........................ 717/152; 717/159
(58) Field of Classification Search ......... 717/136–161
See application file for complete search history.

(56) References Cited

U.S. PATENT DOCUMENTS

| | | | | |
|---|---|---|---|---|
| 4,415,767 A | * | 11/1983 | Gill et al. ................ | 704/243 |
| 4,763,255 A | * | 8/1988 | Hopkins et al. ........... | 717/153 |
| 5,367,651 A | * | 11/1994 | Smith et al. ............... | 717/149 |
| 5,452,241 A | * | 9/1995 | Desrosiers et al. ........ | 708/495 |
| 5,469,572 A | * | 11/1995 | Taylor ...................... | 717/152 |
| 5,724,590 A | * | 3/1998 | Goettelmann et al. ..... | 717/154 |
| 5,907,711 A | * | 5/1999 | Benitez ..................... | 717/145 |
| 5,930,509 A | * | 7/1999 | Yates et al. ................ | 717/159 |
| 6,289,507 B1 | * | 9/2001 | Tanaka et al. ............. | 717/155 |
| 6,301,704 B1 | * | 10/2001 | Chow et al. ............... | 717/146 |
| 6,480,871 B1 | * | 11/2002 | Phatak ...................... | 708/440 |
| 6,567,831 B1 | * | 5/2003 | Loginov .................... | 708/290 |
| 6,631,517 B1 | * | 10/2003 | Lamping et al. .......... | 717/151 |
| 2003/0046449 A1 | * | 3/2003 | Gray-Donald et al. .... | 709/330 |

OTHER PUBLICATIONS

Aho et al., "Compilers: Principles, Techniques, and Tools", 1988, Addison-Wesley, pp. 428, 463, 592 and 596.*

* cited by examiner

*Primary Examiner*—Tuan Dam
*Assistant Examiner*—Andre R. Fowlkes

(57) ABSTRACT

Consider a set of functions, each of whose calculations are almost identical. A common example is the set of trigonometric functions sine, cosine, and tangent. Each of these functions is computed by first performing argument reduction and some preliminary calculations, which are identical for all members of the set. A few unique instructions are performed at the end for each of the functions in the set. Normally, when such functions are encountered, a separate sequence of instructions is called for each function even if the functions appear in close proximity. This results in duplicate instructions being performed which increases execution time and length of compiled program. Specialized functions exists to minimize execution, but programs with such specialized function calls suffer from non-portability. The present invention includes a method and a system to optimize function calls for faster execution while maintaining portability. The present invention requires no specialized knowledge on the part of the programmer and also utilizes standard compiler optimization techniques.

28 Claims, 1 Drawing Sheet

EFFICIENT COMPILATION OF FAMILY OF RELATED FUNCTIONS

FIELD OF THE INVENTION

This invention relates generally to the compilation of functions. More specifically, this invention relates to efficient compilation of a family of related functions.

BACKGROUND OF THE INVENTION

In computer programming, certain sets of functions are related. In other words, for a given set of functions, the calculation of each member function is almost identical. A common example is the set of trigonometric functions, i.e. sine, cosine, tangent, cotangent, secant, and cosecant. Each trigonometric function may be computed by first performing an argument reduction and some preliminary calculations. The argument reduction and the preliminary calculations are identical for all trigonometric functions within the set. A few unique instructions are performed at the end for each member trigonometric function.

Normally, when a conventional compiler encounters a trigonometric function in a program, a separate function call is made for each. Thus, for example, even if calls to sin(theta) and cos(theta) appear in close proximity, two calls are made, each of which executes all of the common instructions, and then the few unique instructions are executed to complete the computation of the desired function.

As an illustration, assume that the following statements appear in a computer program:
X=sin(theta);
Y=cos(theta);

The conventional compiler typically makes the following calls:
R1=call _sin(theta);
R2=call _cos(theta);

As noted above, much of the instructions to perform sine and cosine calculations are identical. For example, on the assignee's IA-64 computer architecture, each trigonometric function may take about 50 instructions to complete. Of these, about 48 instructions may be identical for sine and cosine functions (the tangent function may also have the identical 48 instructions). This indicates that only about the last two instructions are unique for the sine and cosine functions (tangent may require about 12 unique instructions).

With the conventional compiler, as many as 100 instructions may be performed to calculate the sine and cosine values. However, as many as 48 instructions are performed twice, which lengthens the actual execution time and perhaps the compiled program size. Such penalty is multiplied as more member functions from a family of functions are called and the full price of executing each member function is paid by the running program.

Alternatively, special functions, which return all the members (or the most commonly called members) of a related family of functions, are available. However, these function names are non-standard and the user (the programmer) must know the names of the non-standard functions to invoke it and extract values of interest from the resultant structure. While such special function calls may help to speed up the execution, programs written with such special function calls suffer from non-portability, i.e. become architecture specific, and may also become operating system specific, when more than one operating system exists for a specific architecture.

SUMMARY OF THE INVENTION

In one respect, an embodiment of a compiler to optimize compiling a family of related functions may include a member recognizer configured to recognize a member function from the family of related functions. The compiler may also include a family start caller configured to make a family-start function call for the family of functions related to the member function. The compiler may further include a member finish caller to make a member-finish function call for the recognized member function. Any combination of the member recognizer, family start caller, and member finish caller may be incorporated into a front end of the compiler.

In another respect, an embodiment of a method to optimize compiling a family of related functions may include recognizing a member function from said family of related functions. The method may also include making a family-start call for the family of related functions and making a member-finish call for the recognized member function. Further, the method may include optimizing resulting function calls.

The above disclosed embodiments may be capable achieving certain aspects. For example, no special action may be required from the programmer. Also, the portability of the original source code (or program) may be maintained. In addition, the source of identification for the family of related functions may be easily modified. Further, the resulting program may execute faster. Still further, standard compiler optimization techniques may be used to achieve these efficiency improvements.

BRIEF DESCRIPTION OF THE DRAWINGS

Features of the present invention will become apparent to those skilled in the art from the following description with reference to the drawings, in which.

DETAILED DESCRIPTION

Figure 1:
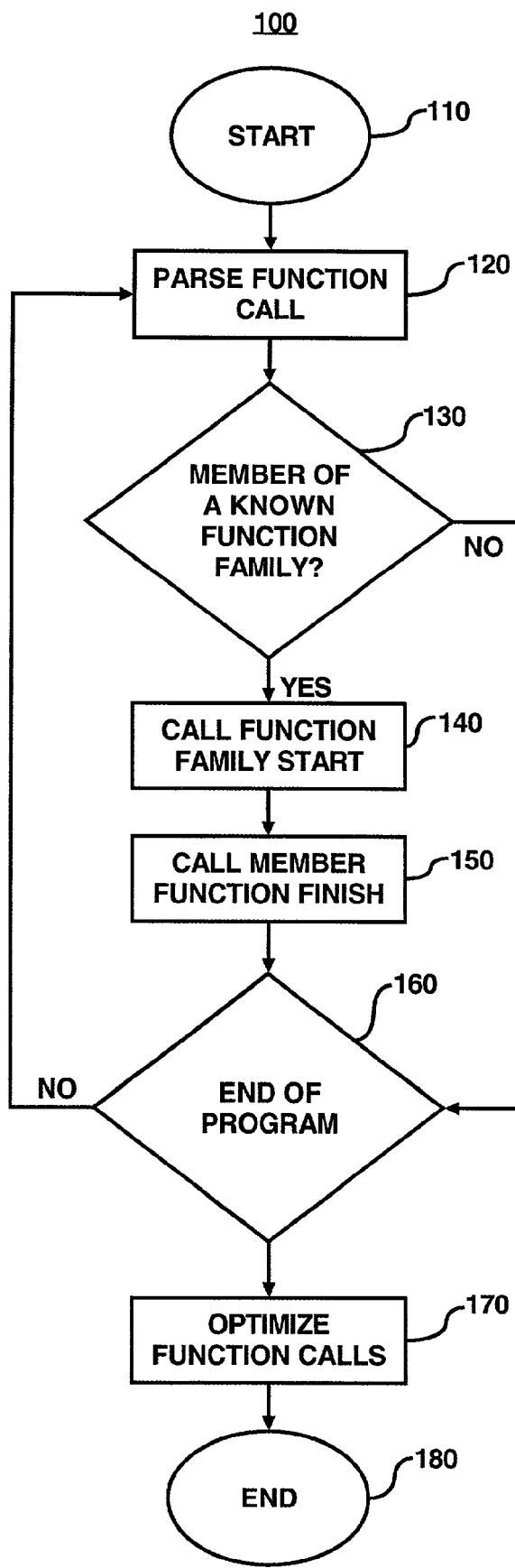
FIG. 1 illustrates a flow chart of an exemplary method for optimizing a set of function calls within a family of related functions.

For simplicity and illustrative purposes, the principles of the present invention are described by referring mainly to exemplary embodiments thereof. However, one of ordinary skill in the art would readily recognize that the same principles are equally applicable to many situations where a family of related function calls may be optimized.

As described in the Background section, a family of related functions is typified in that some part of the instructions performed are identical for each member function of the family. While not exhaustive, families of related functions include trigonometric functions (sin, cos, tan, etc), hyperbolic functions (sin h, cos h, tan h, etc), square root (sqrt, reciprocal sqrt), and the like.

For example, when calculating trigonometric functions, each member function (sin, cos, tan) may be computed by first performing an argument reduction and some preliminary calculations. These computations are typically identical for all member functions. Then computation for each member function may be completed by performing a few unique instructions at the end.

Thus, if the compiler recognizes sin( ), cos( ), and tan( ) as belonging to a family of trigonometric functions, then significant savings in execution time may be realized by eliminating execution of duplicate instructions. Using the IA-64 computer architecture given above as an example (see the Background section), it is seen that 48 instructions may be eliminated when computing both sin(theta) and cos (theta). Thus instead of executing 100 instructions, only 52 instructions may need to be executed. If tan(theta) is also needed, the savings becomes that much greater (64 instructions versus 160—tangent may require more unique instructions).

FIG. 1 illustrates a flow chart of an exemplary method for optimizing a set of function calls within a family of related functions. As shown, the method starts at step 110. At step 120, a function call is parsed. At step 130, it is determined whether the function is a member of a known family of related functions. If the function is not a member of a known family of related functions, then the method proceeds to step 160.

If the function is a member of a known family, then the method proceeds to step 140 where a family-start function call is made. After the family-start call is made, this is followed in step 150 by a member-finish function call.

Afterwards, in step 160, whether or not the end of the program has been reached is determined. If not, then the method iterates from step 120 to parse more function calls. If the end of the program has been reached, then the method proceeds to step 170 where the resulting function calls are optimized.

As an illustration, again assume that the following statements appear in a computer program:
X=sin(theta);
Y=cos(theta);

According to the exemplary method, in step 130, the statement X=sin(theta) would be recognized as being a member of a known family of related functions, namely the trigonometric family of functions. Thus after performing steps 140 and 150, the result may look like the following:
R1=call _trig start(theta);
R2=call _sin finish(R1);

The program statement Y=cos(theta) would be treated in a similar manner and the result may look like the following:
R3=call _trig start(theta);
R4=call _cos finish(R3);

Thus prior to entering step 170 for optimization, the program statements may be translated as follows:
R1=call _trig start(theta);
R2=call _sin finish(R1);
R3=call _trig start(theta);
R4=call _cos finish(R3);

It is seen that the exemplary method entails steps of recognizing member functions, and simply replacing them with appropriate family-start and member-finish function calls. The end result of this process may seem to result in a code that appears to be inefficient at a first glance. Looking at the example given above, the result is that _trig start( ) is called twice with the same argument theta. This occurs because the exemplary method calls for replacing the program statement cos(theta) with the family-start function_ trig start( ), followed by the unique member-finish function_ cos finish( ), even though the same family-start function was called previously due to the presence of the program statement sin(theta).

However, after this replacement process is completed, all instructions, including the family-start calls, may be treated as ordinary instructions during the optimization step 170. Thus, the family-start functions may be subject to all optimization techniques. These techniques may include common subexpression elimination, code motion, and dead-code elimination.

In this instance, during optimization performed at step 170, a standard common elimination routine, which is employed by most standard optimizing compilers, would recognize that R1 and R3 are identical because they both result from calling _trig start( ) with the same argument. The elimination routine would typically automatically transform the above code and the result may look like the following:
R1=call _trig start(theta);
R2=call _sin finish(R1);
R4=call _cos finish(R1)

When optimization is completed, the total number of instructions is reduced since the second call to _trig start( ), taking up to 48 instructions to complete for the IA-64 architecture, has been eliminated.

The method may be relatively simple to implement in compilers. Mainly, a compiler may include a member recognizer configured to recognize a member function from a family of related functions. The compiler may also include a family start caller configured to make a family-start function call for the family of related functions and a member finish caller to make a member-finish function call for said member function. In this manner, the original function call is replaced the appropriate family start and member finish calls to compute the desired value. Afterwards, the standard optimizer may be used to optimize the program.

Any combination of the member recognizer, family start caller, and the member finish caller may be incorporated into a front end of the compiler. Also, any of them may be incorporated into other phases of the compiling. For example, the transformation of the original function calls to the family start and member finish calls may be performed during a prepass phase of the compilation.

Note that the family-start and member-finish calls may be made to appear as primitive instructions in an intermediate language, i.e. a language independent of specific architectures and independent of specific operating systems. Because these calls have been made to appear as primitive instructions, the optimizer may also perform optimization on the calls made in the same intermediate language.

The intermediate language code, whether optimized at the intermediate language level or not, may undergo an architecture specific optimization. For example, the compiler may in-line expand one or both the family-start and member-finish functions to take advantage of hardware parallelism that a particular architecture provides. The code may also undergo an operating system specific optimization. In these instances, certain operating system calls may allow access to the hardware resources faster than other operating system calls.

In one implementation, the call to the family-start function may return a structure of values. For example, in an implementation of the trigonometric family of functions, the angular argument theta may be broken into two angles A and B, wherein sin(A) and cos(A) are obtained quickly from a look-up table and sin(B) and cos(B) are quickly computed by a short polynomial. The final result may be then computed from well-known trigonometry identities:

$$\sin(theta)=\sin(A+B)=\sin(A)\cos(B)+\cos(A)\sin(B);$$

$$\cos(theta)=\cos(A+B)=\cos(A)\cos(B)-\sin(A)\sin(B);$$

Then, it may be convenient to have _trig start ( ) return four values, corresponding to sin(A), cos(A), sin(B), and cos(B), as shown by the following declaration in the C programming language:

```
typedef struct {
    double sina;
    double cosa;
    double sinb;
    double cosb;
} trigreturn;
```

Then the functions _sin finish( ) and _cos finish( ) can be described in the C programming language as follows:

```
_sinfinish(trigreturn x) {
    double temp;
    temp = x.sina * x.cosb;
    return fma(x.cosb, x.sina, temp);
}
and
_cosfinish(trigreturn x) {
    double temp;
    temp = x.cosa * x.cosb
    return fma(-x.sina, x.sinb, temp);
}
```

For informational purposes, fma( ) is an function introduced into the C99 standard for the C language. Thus using the fma( ) function does not destroy portability. A call to fma(a, b, c) computes a*b+c with only one rounding, after the sum has been computed. On architectures such as IA-64, Power PC™, and PA-RISC™, fma( ) is available as a single machine-language instruction.

Also, many architectures such as IA-64, Power PC™, and PA-RISC™ contain variants of fma( ) to compute a*b−c (often called fms( )) and −a*b+c (often called fnma( )). With these architectures, the compiler can replace an fma( ) call with one of its arguments negated with one of the alternate instructions, which avoids an extra operation to actually negate that argument.

When compiling for architectures lacking the fma( ) instruction, the finish routines may be rewritten in terms of simple addition and multiplication, with a slight loss of accuracy, but retaining relatively high performance. Examples of such architectures are IA-32™ and Sparc™.

In another implementation of the trigonometric functions, the completely evaluated approximating polynomials for sin(B) and cos(B) are not returned. Instead, the value B itself is returned, as well as approximations to sin(B)/B, and (cos(B)−1)/B. While these quantities may appear to be complicated, the sin(B)/B results from omitting the final multiplication of an approximating polynomial to sin(B) by B. Likewise, (cos(B)−1)/B results from omitting the final constant term 1 from the cosine approximation, as well as omitting a multiplication by B. This seemingly more complicated approach leads to slightly better accuracy, at no cost in additional computation. The _trig start( ) routines may be shorter, and the member-finish function routines may be slightly longer. For this implementation, the defining structure may look like the following:

```
typedef struct {
    double b;
    double sina;
    double cosa;
    double sseriesb;
    double cseriesb;
} trigreturn2;
```

The finishing member functions may become one instruction longer each as shown below:

```
_sinfinish(trigreturn2 x) {
    double temps;
    temps = x.sina * x.cseriesb;
    temps = fma(x.sseriesb, x.cosa, temps);
    return fma(temps, x.b, x.sina);
}
and
_cosfinish(trigreturn2 x) {
    double tempc;
    tempc = x.cosa * x.cseriesb;
    tempc = fma(-x.sina, x.sseriesb, tempc);
    return fma(tempc, x.b, x.cosa);
}
```

In yet another implementation of the trigonometric functions, the call to the family-start function returns a structure with resultant values of all member functions. In this instance, the defining structure may look like the following:

```
typedef struct {
    double sinresult;
    double cosresult;
} trigreturn3;
```

For this implementation, the _sin finish(x) and cos finish(x) may simply refer to the x. sin result and x. cos result quantities, respectively. However, this is not preferred since it occasionally sets spurious exception bits. Also, it may be that not all member functions are called in the source code resulting in unnecessary calculations being performed.

Hyperbolic functions lend themselves to a substantially similar treatment to the trigonometric functions. The details of the implementation should be obvious to one of ordinary skill.

Square root and reciprocal square root also lend themselves to this exemplary methodology. Often, to calculate the square root, the reciprocal square root is calculated first, and then the square root is derived from the reciprocal square root. Using the exemplary methodology outlined, the family-start function, perhaps named _rsqrt( ) may return the reciprocal square root itself. In this instance, because only a single value is returned, a structure associated with the result may not be necessary.

The finishing routine, perhaps named _sqrt finish( ), using the result named recip from _rsqrt(x), may look like the following:

```
double _sqrtfinish(double x, double recip)
{
    double root, d;
    root = x * recip; //stopping here may leave rounding error
    d = fma (root, root, -x);
    return fma (d, 0.5 * recip, root); // correctly rounded
}
```

Thus when the compiler encounters a sqrt(x), the compiler may simply insert recip=_rsqrt(x) followed by a call to _sqrt finish(x, recip). However, if the compiler encounters sqrt(x) as a denominator of an expression, for example 1/sqrt(x), it may simply insert recip=_rsqrt(x) and use the value recip as the result of 1/sqrt(x), and the finishing routine can be empty.

This technique for square roots is of particular importance in graphic rendering where the reciprocal square root is used more frequently than the square root itself.

Again, it bears repeating that the invention is not limited to trigonometric, hyperbolic, and square root functions. The scope of the invention includes any family of related functions. Note that the knowledge of these families of related functions need not be encoded in the compiler itself. It may be preferred that the definitions for function families are contained in a separate look-up table or other data store. For example, data store may include ascii files, binary data files, database files, and more. The benefit of this implementation is that defining new families does not require changes to the actual compiler executable; the compiler may continue to work in the same manner regardless of the information in the data store. Another benefit from such an implementation is that it may be possible to add custom families to the data store and receive the same efficiency improvements from custom defined families as from common sets of functions like the trigonometric or hyperbolic functions discussed above. Also, it is seen that no special knowledge is required on the part of the programmer. The programmer writes code in a standard language (C, C++, J++, Fortran, etc). Thus, portability of the source code is maintained.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A compiler used by a computer architecture to compile a family of related functions, comprising:
    a member recognize configured to recognize a member function from said family of related functions, wherein each member function of the family of member functions is a mathematical function operable to be executed using a set of instructions and a portion of the set of instructions for each member function are identical;
    a family start caller configured to make a family-start function call for said family of related functions, wherein the family-start function call is a call to a family-start function performing the identical set of instructions for each member function;
    a member finish caller to make a member-finish function call for said member function, wherein the member-finish function call is a call to a member-finish function performing instructions unique to the member function; and
    an optimizer configured to optimize said family-start function call;
    wherein the optimized family-start function call causes execution of the portion of the set of instructions that are identical for each member function to occur prior to execution of instructions for each of a plurality of member-finish functions to reduce a number of instructions executed by the computer architecture in computing more than one member function from said family of related functions.

2. The compiler of claim 1, in which the optimizer is further configured to optimize said member finish function calls.

3. The compiler of claim 1, wherein said optimizer is configured to optimize on at least one of intermediate language level, architecture specific level, and operating system specific level.

4. The compiler of claim 1, wherein said optimizer is configured to in-line expand at least one of said family-start and member-finish calls.

5. The compiler of claim 1, wherein said optimizer includes common subexpression elimination, code motion, and dead-code elimination.

6. The compiler of claim 1, wherein said family of related functions includes at least one of trigonometric, hyperbolic, and square root functions.

7. The compiler of claim 1, wherein said family of related functions is identified by use of a data store.

8. The compiler of claim 7, wherein said data store includes at least one of look-up table, an ascii file, a binary file, and a database file.

9. The compiler of claim 7, wherein said data store is modifiable.

10. The compiler of claim 1, wherein one or both of said family start caller and said member finish caller are configured to make said family-start and member-finish function calls, respectively, in an intermediate language.

11. The compiler claim 10, wherein said intermediate language is non-architecture specific and non-operating system specific.

12. The compiler of claim 1, wherein said member-finish function call makes use of a result returned from said family-start function call.

13. A method to compile a family of related functions, comprising:
    recognizing a member function from said family of related functions wherein each member function of the family of member functions is a mathematical function operable to be executed using a set of instructions and a portion of the set of instructions for each member function are identical;
    making a family-start call for said family of related functions wherein the family-start function call is a call to a family-start function performing the identical set of instructions for each member function;
    making a member-finish call for said member function, wherein the member-finish function call is a call to a member-finish function, performing instructions unique to the member function; and
    optimizing said family-start call to cause execution of the portion of the set of instructions that are common identical for each member function to reduce a number of instructions executed by a computer architecture in computing more than one member function from sail family of related functions.

14. The method of claim 13, further comprising:
    optimizing member-finish function calls.

15. The method of claim 13 wherein said optimizing step includes:
    optimizing on at least one of intermediate language level and architecture specific level.

16. The method of claim 13 wherein said optimizing step includes: in-line expanding at least one of said family-start and member-finish calls.

17. The method of claim 13, wherein said optimizing step includes common subexpression elimination, code motion, and dead-code elimination.

18. The method of claim 13 wherein said family of related functions includes at least one of trigonometric, hyperbolic, and square root functions.

19. The method of claim 13 wherein said recognizing step includes: identifying said member function through a data store.

20. The method of claim 19 wherein said data store includes at least one of a look-up table, an ascii file, a binary file, or a database file.

21. The method of claim 19, further comprising: modifying said data store.

22. The method of claim 13 wherein said family-start and member-finish function calls are made in an intermediate language.

23. The method of claim 22 wherein said intermediate language is non-architecture specific and non-operating system specific.

24. The method of claim 13 wherein said member-finish function call makes use of a result returned from said family-start function call.

25. The compiler of claim 1, wherein at least one calculation is almost identical for each member function of the family of related functions.

26. The compiler of claim 25, wherein at least one calculation is identical for each member function of the family of related functions.

27. The method of claim 13, wherein at least one calculation is almost identical for each member function of the family of related functions.

28. The method of claim 27, wherein at least one calculation is identical for each member function of the family of related functions.

* * * * *

UNITED STATES PATENT AND TRADEMARK OFFICE
CERTIFICATE OF CORRECTION

PATENT NO. : 7,065,757 B2  Page 1 of 1
APPLICATION NO. : 09/964769
DATED : June 20, 2006
INVENTOR(S) : Peter Markstein et al.

It is certified that error appears in the above-identified patent and that said Letters Patent is hereby corrected as shown below:

In column 7, line 41, in Claim 1, after "member" delete "recognize" and insert -- recognizer --, therefor.

In column 8, line 20, in Claim 8, after "one of" insert -- a --.

In column 8, line 28, in Claim 11, after "compiler" insert -- of --.

In column 8, line 37, in Claim 13, after "functions" insert -- , --.

In column 8, line 43, in Claim 13, after "functions" insert -- , --.

In column 8, line 48, in Claim 13, after "function" delete ",".

In column 8, line 57, in Claim 14, after "optimizing" insert -- said --.

Signed and Sealed this

Seventh Day of April, 2009

JOHN DOLL
*Acting Director of the United States Patent and Trademark Office*